March 27, 1956

W. L. AMES 2,739,693

MATERIAL HANDLING APPARATUS

Filed April 17, 1953

INVENTOR
W. L. AMES
BY
ATTORNEY

March 27, 1956 — W. L. AMES — 2,739,693
MATERIAL HANDLING APPARATUS
Filed April 17, 1953 — 3 Sheets-Sheet 2

INVENTOR
W. L. AMES
BY
ATTORNEY

March 27, 1956 W. L. AMES 2,739,693
MATERIAL HANDLING APPARATUS
Filed April 17, 1953 3 Sheets-Sheet 3

INVENTOR
W. L. AMES
BY
ATTORNEY

United States Patent Office 2,739,693
Patented Mar. 27, 1956

2,739,693

MATERIAL HANDLING APPARATUS

William L. Ames, Middle River, Md., assignor to Western Electric Company, Incorporated, New York, N. Y., a corporation of New York Application April 17, 1953, Serial No. 349,502

4 Claims. (Cl. 198—21)

This invention relates to material handling apparatus, and more particularly to conveyor unloading apparatus.

It is a common practice to utilize a main conveyor system for transporting articles from a supply area to a number of remote processing areas in a factory. The articles are transported continuously around the main conveyor system and are unloaded at the various processing areas as required to replenish the supply at these locations. In order to eliminate the expense and delay involved in unloading the articles from the main conveyor manually, it is desirable that suitable apparatus be provided in each processing area for unloading articles from the conveyor and delivering them to operating stations within the area in accordance with the needs of an operator.

An object of this invention is to provide new and improved material handling apparatus.

Another object of this invention is to provide new and improved conveyor unloading apparatus.

An apparatus illustrating certain features of the invention may include means positioned adjacent to a conveyor for ejecting articles therefrom, article-receiving means selectively movable into a position for receiving articles ejected from the conveyor and means for rendering the article-ejecting means inoperative whenever the article-receiving means is not positioned for receiving an ejected article from the conveyor.

A complete understanding of the invention may be had from the following detailed description, when read in conjunction with the appended drawings, in which:

Fig. 5 is a schematic diagram of an electrical circuit associated with the conveyor unloading apparatus;

Fig. 7 is an enlarged, fragmentary perspective view of a portion of the apparatus shown in Fig. 6.

Figure 1:
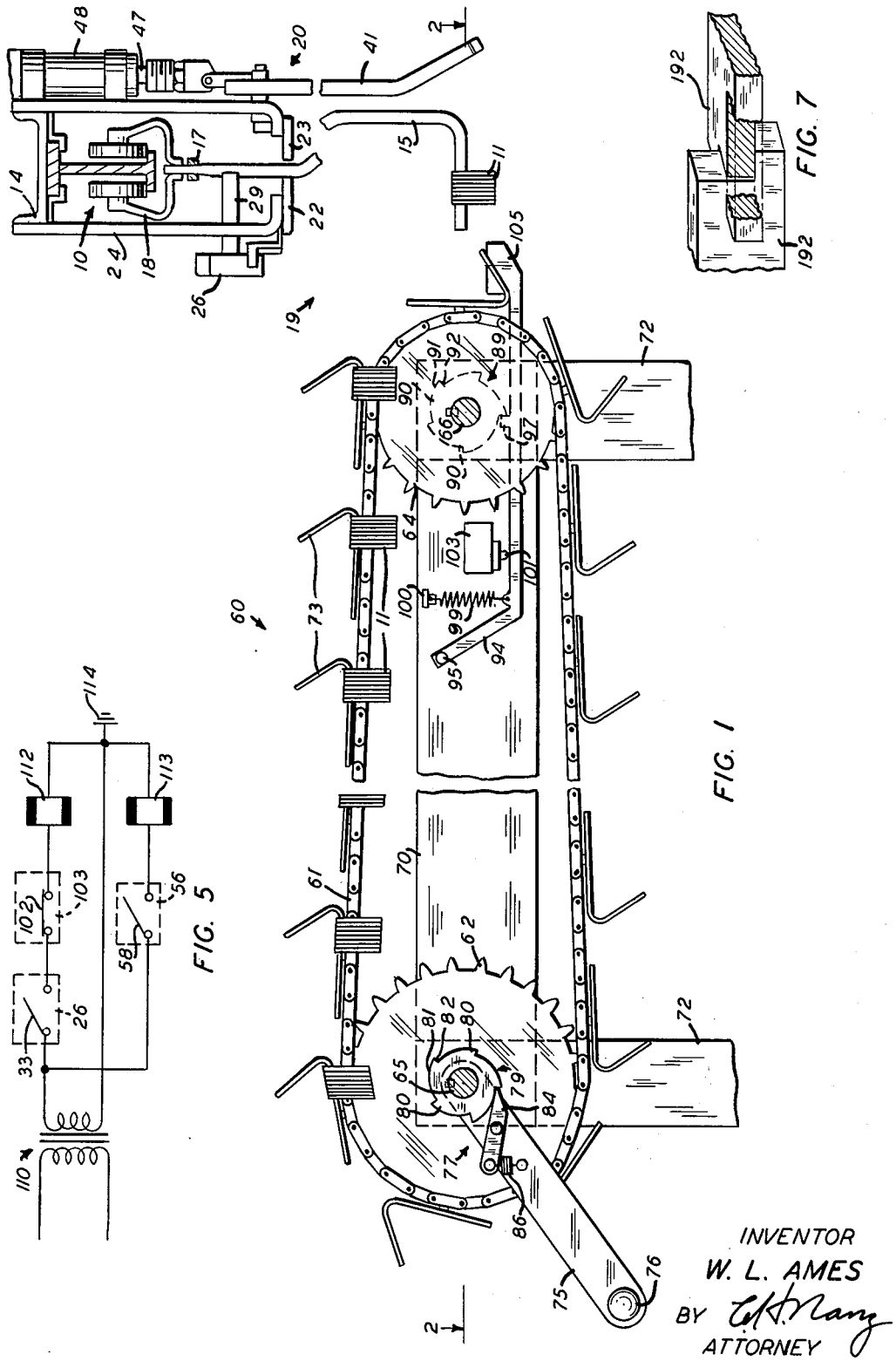
Fig. 1 is a fragmentary side elevation of conveyor unloading apparatus representing a preferred embodiment of the invention.
Figure 3:
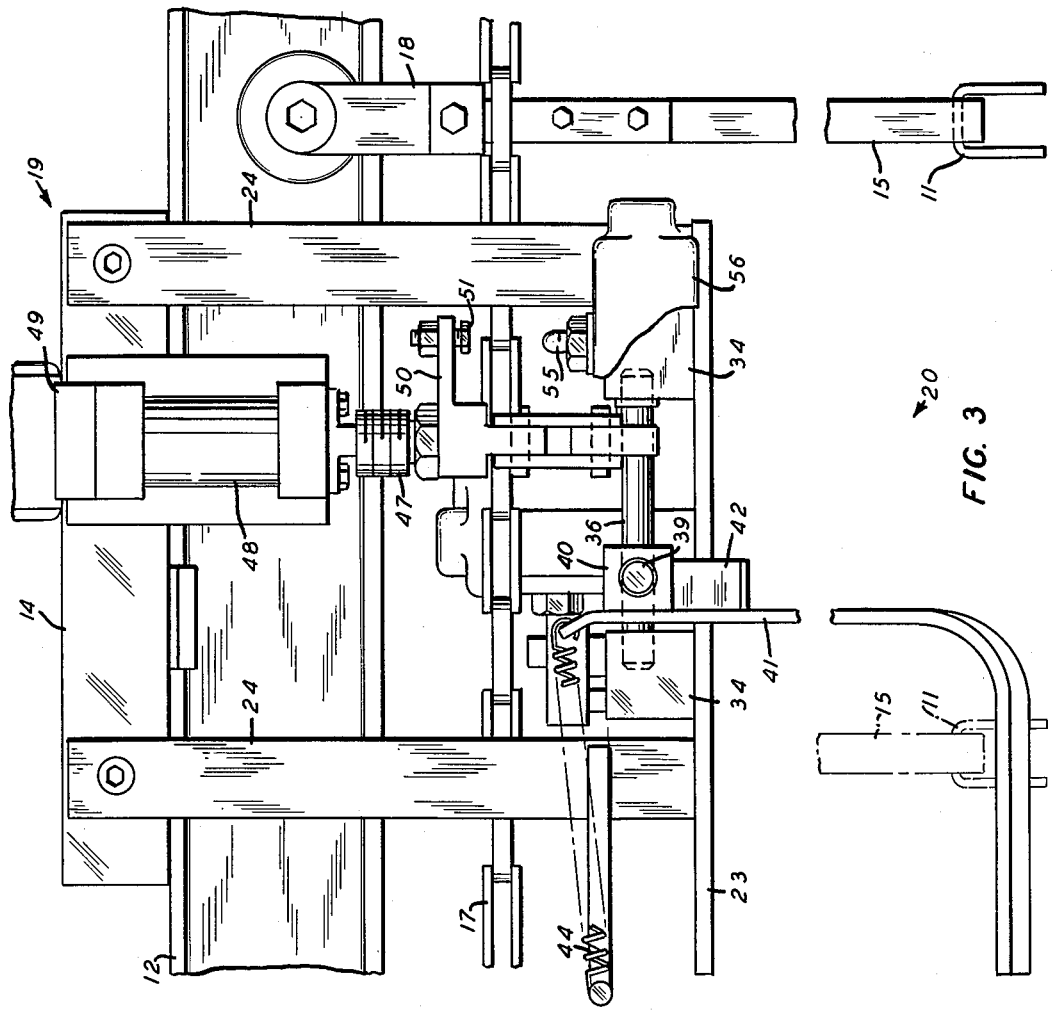
Fig. 3 is an enlarged side elevation of an article-ejecting mechanism forming a part of the conveyor unloading apparatus.

Referring now to Fig. 1, there is shown a section of an overhead monorail conveyor 10 for transporting bundles 11—11 of electrical cords from a supply area to a remote processing area wherein subsequent operations are to be performed on the individual cords. The monorail conveyor 10 includes a monorail track 12 suspended from a suitable support structure (not shown) by means of spaced hangers, one of which designated 14 is shown in Figs. 1 and 3. The cord bundles 11—11 are transported along the monorail conveyor 10 by a plurality of generally L-shaped carrier hooks, one of which designated 15 is shown, attached at uniformly spaced intervals to a tractor chain 17. Each carrier hook 15 is pendantly supported on a free-wheeling trolley 18 which is arranged to roll along the monorail track 12. Suitable means (not shown) are provided for continuously driving the tractor chain 17 to propel the carrier hooks and their associated trolleys along the monorail track 12.

Located adjacent to each processing area is an unloading station 19 (Fig. 1) at which the bundles 11—11 of cords may be unloaded from the monorail conveyor 10, as needed, and delivered to an operating station located in the processing area. At the unloading station 19 a bundle-ejecting mechanism 20 is provided for unloading the bundles 11—11 of cords from their associated carrier hooks, one of which designated 15 is shown in Fig. 1.

Figure 4:
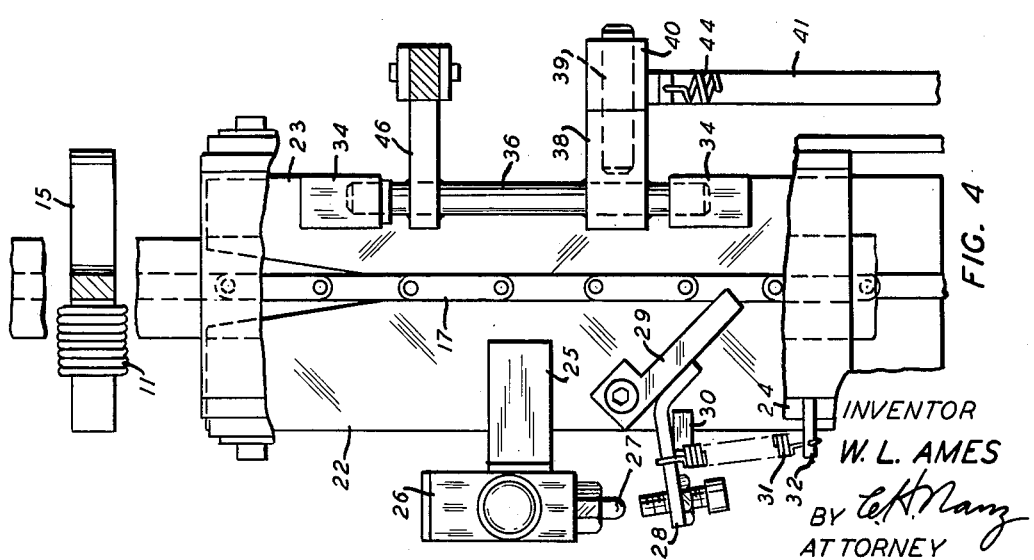
Fig. 4 is a plan view of the article-ejecting mechanism shown in Fig. 3, which is partly broken away for clarity.

The bundle-ejecting mechanism 20 (Fig. 3) includes a pair of spaced, horizontal guide plates 22 and 23, the opposed edges of the plates forming a guideway having a converging entrance (Fig. 4) for guiding the shank of a carrier hook. The guide plates 22 and 23 are supported by brackets 24—24 secured to and depending from a hanger 14. Mounted on the guide plate 22 by means of a bracket arm 25 is a sensitive switch 26 having a spring-biased actuator 27. The actuator 27 is arranged to be operated by a contact lever 28 secured to a pivoted striker arm 29, the free end of which is normally urged against a stop 30 and into the path of the shank of a carrier hook 15 by means of a tension spring 31 secured at one end to the lever and at its other end to an anchor tab 32 attached to one of the brackets 24—24. The arrangement of the pivoted striker arm 29 and the contact lever 28 is such that as a carrier hook 15 advances through the guideway formed by the horizontal plates 22 and 23, the lever 28 is pushed against the actuator 27 of the sensitive switch 26 to close an associated contact 33 (Fig. 5) provided therein.

Figure 2:
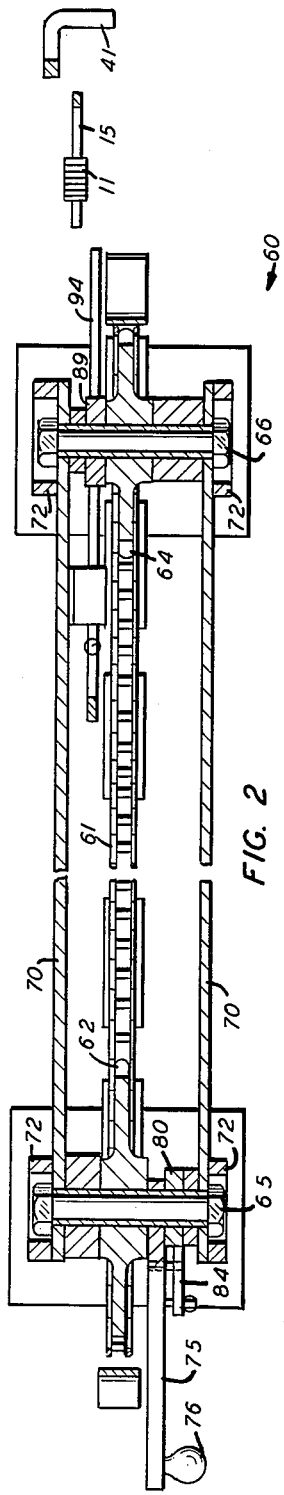
Fig. 2 is a plan section view taken along line 2—2 of a portion of the apparatus shown in Fig. 1.

Mounted on the guide plate 23 (Fig. 3) are a pair of bearing blocks 34—34 (Figs. 2 and 3), which pivotally support at opposite ends a shaft 36 mounted therebetween for angular movement about an axis parallel to the monorail track 12. Welded to the shaft 36 and projecting perpendicularly therefrom is a bearing housing 38, which rotatably supports a stub shaft 39 projecting axially therefrom. Rotatably mounted on the stub shaft 39 for angular movement about the longitudinal axis thereof is a bearing block 40 to which one end of an L-shaped ejector arm 41 is fixedly secured. This arrangement for connecting the ejector arm 41 to the shaft 36 permits the arm to pivot and describe arcs in two perpendicular planes. Its arcuate movement in a plane perpendicular to the monorail track 12 may be accomplished by the rotation of the shaft 36. The ejector arm is also capable of swinging in a plane parallel to the monorail track because the bearing block 40 is rotatably mounted on the stub shaft 39. A stop 42 welded to the housing 38 limits the counterclockwise swing of the arm 41, as viewed in Fig. 2, in the plane parallel to the monorail track 12 and the arm is normally held in a vertical position in this plane and against the stop by means of a tension spring 44.

Angular rotation of the shaft 36 is accomplished by means of an eccentric crank 46 fixedly secured thereto, the free end of which is hingedly connected to the piston rod 47 of a double-acting pneumatic cylinder 48 (Fig. 3) mounted to the hanger 14. Air under pressure is supplied to the pneumatic cylinder 48 through a double-acting solenoid operated valve 49, which is operated to control the movements of the piston rod 47 by means of an associated electrical circuit (Fig. 5). Attached to and projecting laterally from the piston rod 47 is a lug 50 (Fig. 3) provided with a threaded, adjustable striker 51 designed to contact an actuator 55 on a limit switch 56 when the piston 47 reaches the downward limit of its stroke. The limit switch 56 is suitably mounted to the guide plate 23 and provided with a normally open contact 58 (Fig. 5).

As shown in Fig. 3, the free end of the ejector arm 41 is bent at right angles to the straight shank portion thereof and extends laterally and transversely with respect to the hooked portion of a carrier hook 15 (Fig. 1). The height of the bent end portion of the ejector arm 41 with respect to the hooked portion of a carrier hook 15 is such that when the ejector arm describes an arc in a plane perpendicular to the monorail track 12, the bent end portion of the ejector arm passes a short distance beneath the carrier hook. As the bent end portion of the ejector arm 41 passes beneath a carrier hook 15 in a clockwise direction, as seen in Fig. 1, it will engage the dangling ends of a cord bundle 11 positioned on the carrier hook and push the bundle from the hook.

Positioned adjacent to the unloading station 19 is a manually operated unloading conveyor 60 (Fig. 1) for receiving cord bundles 11—11 which are ejected from the carrier hooks, and for delivering them to an operating station. The unloading conveyor 60 includes an endless roller chain 61 arranged to travel about a driver sprocket 62 and an idler sprocket 64. The sprockets 62 and 64 are rotatably mounted on parallel, spaced shafts 65 and 66, respectively, which are transversely mounted between parallel, longitudinal frame members 70—70. The frame members 70—70 are supported in horizontal spaced alignment perpendicular to the monorail track 12 by support columns 72—72.

Secured to the roller chain 61 at uniformly spaced intervals therealong are a plurality of flanged carrier pallets 73—73 (Fig. 1) designed to receive cord bundles 11—11 deposited thereupon and to transport them along the upper leg of the loop formed by the endless chain. The roller chain 61 may be intermittently driven in a counter-clockwise direction by actuating an operating lever 75 having a handle 76, which is operatively connected to the driver sprocket 62 by means of a ratchet and pawl assembly shown generally at 77 (Fig. 1). The assembly 77 includes a ratchet wheel 79 mounted on the shaft 65 and fixedly secured to the drive sprocket 62 for rotation therewith. The periphery of the ratchet wheel 79 is provided with a plurality of ratchet teeth 80—80, each of the teeth having an arcuate, sloping, camming face 81 and a radial detent engaging face 82. Cooperating with the toothed periphery of the ratchet wheel 79, is a pawl 84 pivotally mounted on the operating lever 75, which in turn is loosely mounted on the shaft 65. A positive engagement of the pawl 84 with the ratchet wheel 79 is insured by a tension spring 86 which urges the free end of the pawl against the periphery of the ratchet wheel.

A cam 89 (Fig. 1), similar in shape to the ratchet wheel 79, is mounted on the shaft 66 and is fixedly secured to the idler sprocket 64 for rotation therewith. The cam 89, like the ratchet wheel 79, is provided with a plurality of teeth 90—90, each of which is formed with an arcuate camming face 91 and a radial detent engaging face 92.

A generally L-shaped trigger arm 94 is pivotally mounted at one end on a transversely disposed shaft 95 mounted between the frame members 70—70. A projecting detent 97 provided on the trigger arm 94 at a point intermediate the ends thereof is normally urged into cooperation with the periphery of the ratchet wheel 89 by a tension spring 99 secured at one end to a cross member 100 mounted between the frame members 70—70.

As illustrated in Fig. 1, the trigger arm 94 is normally held in pressing contact against a spring-biased actuator 101 of a sensitive switch 103 when the detent 97 bears against the detent engaging face 92 of the cam 89. The force exerted by the trigger arm 94 against the actuator 101 is sufficient to hold a contact 102 (Fig. 5) of the switch 103 in a closed position. The arrangement and design of the cam 89 is such that when the detent engaging face 92 registers with the detent 97, one of the carrier pallets 73—73 is accurately positioned at an extreme right hand position of the endless roller chain loop for receiving a cord bundle 11 ejected from the conveyor 10 at the unloading station 19. In this position, which will hereinafter be referred to as the "pallet loading" position, the carrier pallet 73 is oriented so that its angularly disposed rear wall and bottom form a crook for catching the bundle 11 ejected from a carrier hook.

The free end of the trigger arm 94 is provided with a trippable extension 105 for sensing the presence of a cord bundle 11 on a pallet presently occupying the "pallet loading" position. The extension 105 is positioned adjacent to a pallet 73 occupying the "pallet loading" position and projects a short distance above the bundle-engaging crook portion on the pallet. Whenever a cord bundle 11 falls into the crook portion, the weight of the bundle will overcome the force exerted by the tension spring 99, thereby depressing the extension and causing the trigger arm 94 to pivot clockwise (as viewed in Fig. 1) by an amount sufficient to release the actuator 101 and open the contact 102 of the sensitive switch 103.

Referring now to Fig. 5, there is shown a schematic diagram of an electric circuit associated with the above-described apparatus. The circuit is supplied from a suitable source of electrical energy (not shown) through a transformer 110. Connected to the secondary of the transformer 110, is a series arrangement of the contact 33 of the sensitive switch 26, the contact 102 of the sensitive switch 103, and a solenoid coil 112 of the solenoid operated double-acting valve 49. Connected in parallel with the series arrangement of the contacts 33 and 102, and the solenoid 112 is a series arrangement of the contact 58 of the limit switch 56 and a second solenoid coil 113 of the double-acting valve 49. One terminal of the secondary of the transformer 110 is grounded at 114. From this circuit arrangement it is apparent that when either of the contacts 33 and 102 is open, it is impossible to energize the solenoid coil 112. Likewise, if the contact 58 is open, it is impossible to actuate the solenoid coil 113.

*Operation*

In operation, the carrier hooks represented by the carrier hook 15 travel continuously along the monorail conveyor 10 with cord bundles 11—11 supported on their hooked portions. The ends of the individual cords comprising a bundle 11 dangle down as illustrated in Fig. 3. As a carrier hook 15 approaches the unloading station 19, the shank of the carrier hook enters the converging entrance in the guideway formed by the opposed edges of the guide plates 22 and 23. Upon advancing further, the shank of the carrier hook engages the pivoted striker arm 29, which moves the contact lever 28 against the actuator 27 of the sensitive switch 26, thereby closing its associated contact 33.

Provided that one of the carrier pallets 73—73 is in the "pallet loading" position at the extreme right hand end (as viewed in Fig. 1) of the loop formed by the endless chain 61 and that this particular pallet is not loaded with a cord bundle 11, the contact 102 of the sensitive switch 103 will be closed, since the detent 97 then bears against the detent engaging face 92 of the cam 89 and the trigger arm 94 is pressed against the actuator 101. Assuming that the above conditions are fulfilled and the contact 102 is closed, the closing of the contact 33 of the sensitive switch 26 energizes the solenoid coil 112 of the double-acting valve 49, which introduces air under pressure to the pneumatic cylinder 48 so as to force the piston rod 47 downward.

The downward movement of the piston rod 47 rotates the shaft 36, causing the ejector arm 41 to rotate clockwise (as viewed in Fig. 1) in the plane perpendicular to the track 12 and to sweep the cord bundle 11 from the advancing carrier hook 15. The ejected cord bundle 11 drops into the crook portion of the empty carrier pallet positioned in the "pallet loading" position. As the cord bundle 11 drops onto the pallet, the extension 105 on the trigger arm 94 is depressed, thereby causing the trigger arm to rotate clockwise (Fig. 1) by an amount sufficient to release the actuator 101 and open the contact 102 of the sensitive switch 103. Hence, if succeeding carrier hooks 15—15 reach the unloading station 19 before an empty pallet 73 is indexed into the "pallet loading" position, the closing of the contact 33 of the sensitive switch 26 will not effect the operation of the ejector arm because of the open contact 102.

When the piston rod 47 reaches the downward limit of its travel after ejecting the cord bundle 11 from the carrier hook, the spring-biased actuator 55 is operated by the striker 51, which immediately closes the contact 58 of the limit switch 56 to energize the solenoid coil 113 of the valve 49. The energization of the solenoid coil 113 causes the valve to operate so as to introduce air under pressure to the underside of the piston causing the piston rod 47 to assume its raised position, thereby moving the ejector arm 41 out of the path of the next advancing carrier hook 15. However, as a safety measure, if due to some inadvertent cause the ejector arm 41 is not moved out of the path of an advancing carrier hook, the ejector arm is free to swing clockwise (as viewed in Fig. 3) on the stub shaft 39 in a plane parallel to the path of the advancing carrier hook, thereby preventing jamming and damage to the conveyor 10 or the ejector arm 41.

The left hand end of the unloading conveyor 60 (Fig. 1) is positioned adjacent to an operating station at which subsequent operations are to be performed on the individual cords of the cord bundles 11—11. An operator located at the operating station may cause the carrier pallets 73—73 and their cord bundles 11—11 to advance step by step in a counterclockwise direction along the upper leg of the chain loop by manually oscillating the lever 75. As a loaded pallet reaches the left hand end of the unloading conveyor 60, it is carried around the driver sprocket 62 on the roller chain 61, whereby its associated cord bundle 11 spills from the pallet and falls into a suitable receptacle (not shown) positioned adjacent to this end of the conveyor. The operator manually operates the lever 75 whenever the supply of cord bundles 11—11 at the operating station needs replenishment.

*Alternative embodiment*

Figure 6:
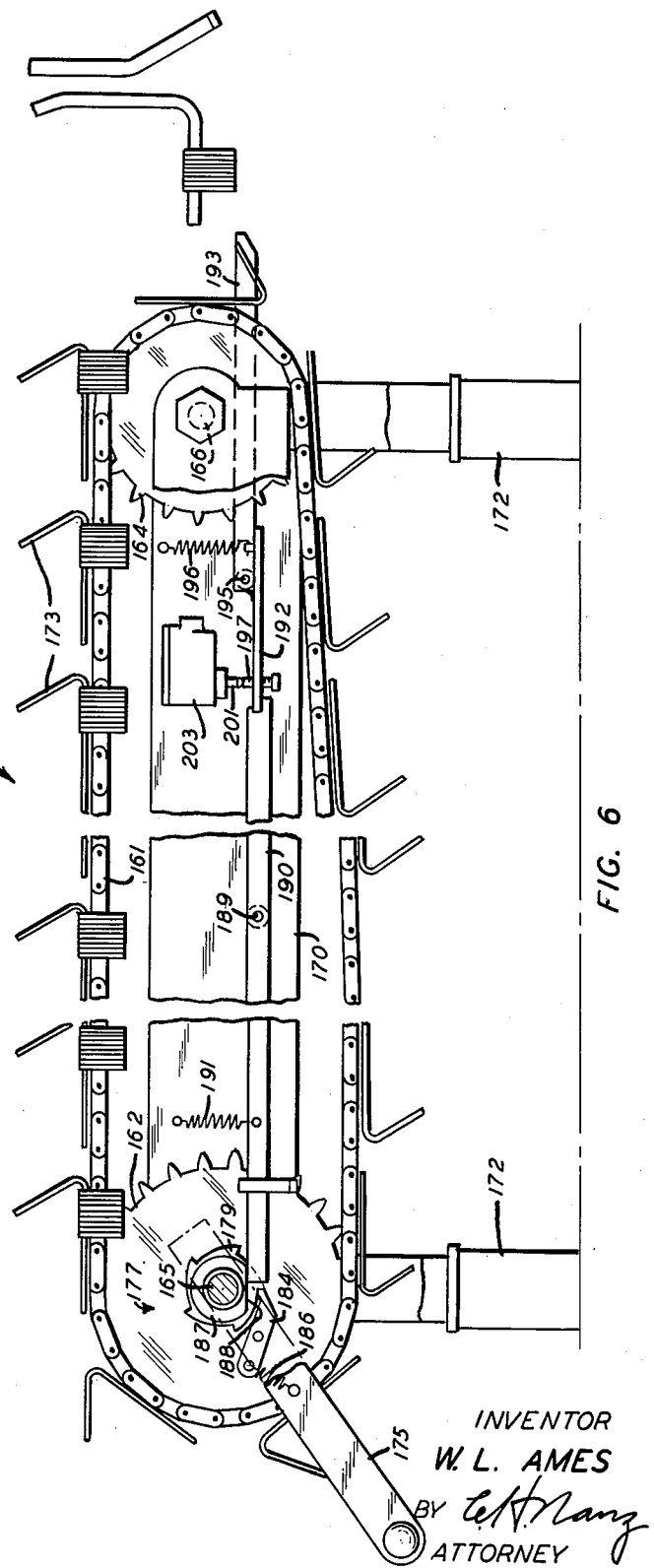
Fig. 6 is a side elevation of an alternative embodiment of the invention.

The embodiment of the invention shown in Figs. 6 and 7 includes an unloading conveyor 160 for accomplishing the same result as the unloading conveyor 60 and for the purposes of illustration it is associated with the same type of overhead monorail conveyor and unloading station as was described above in relation to the preferred embodiment. Since the monorail conveyor and unloading station with its associated ejector mechanism are the same as that shown in Fig. 1, it is not believed necessary to repeat the description thereof.

Referring now to Fig. 6, the alternative embodiment of the apparatus comprises an endless roller chain 161 arranged to travel about a drive sprocket 162 and an idler sprocket 164. The sprockets 162 and 164 are rotatably mounted on parallel, spaced shafts 165 and 166, respectively, which are mounted on frame members 170—170 substantially identical in structure to the frame members 70—70 and are similarly supported by support columns 172—172. A plurality of carrier pallets 173—173, substantially identical in structure to the conveyor pallets 73—73, are fixedly secured to the roller chain 161 at uniformly spaced intervals therealong.

Loosely mounted on the shaft 165 is an operating lever 175 arranged to operate the sprocket 162, which is operatively connected thereto by means of a ratchet and pawl assembly shown generally at 177. The assembly 177 includes a conventional ratchet wheel 179 substantially identical to the ratchet wheel 79. The rachet wheel 179 is fixedly secured to the driver sprocket 162 for rotation therewith about the shaft 165. A pawl 184 is pivotally mounted on the operating lever 175 and is urged into engagement with the toothed periphery of the ratchet wheel 179 by means of a tension spring 186.

Secured to the operating lever 176, for angular movement therewith on the shaft 165, is a cam 187 having a periphery which is generally circular except for a flat portion 188. Pivotally mounted on a transversely disposed fulcrum rod 189 is a longitudinally extending lever 190, the left hand end of which, as seen in Fig. 6, is held in engagement with the periphery of the cam 187 by means of a tension spring 191. The opposite end of the lever 190 is notched (Fig. 7) and intermeshes with a bifurcated contactor plate 192 fixedly secured to a pivoted detector arm 193.

The detector arm 193 is pivotally mounted at its left hand end, as viewed in Fig. 6, on a transversely disposed fulcrum rod 195. The opposite end of the detector arm is positioned adjacent to a pallet 173 occupying a "pallet loading" position at the extreme right hand position on the endless roller chain loop. This end of the arm 193 projects a short distance above the bundle-engaging crook portion on the pallet so that when a cord bundle is dropped onto the pallet in this position, the weight of the bundle causes the detector arm to pivot in a clockwise direction. A tension spring 196 normally urges the detector arm into its normal horizontal position, which it occupies whenever the pallet in the "pallet loading" position is empty. Adjustably mounted near the left end of the contactor plate 192 is a threaded post 197 positioned in alignment with a spring-biased actuator 201 of a sensitive switch 203, which is substantially identical to the sensitive switch 103.

As shown in Fig. 6, the left hand end of the lever 190 engages only the flat portion 188 of the cam 187 when the ratchet wheel is so oriented as to position one of the pallets 173—173 in the "pallet loading" position. When a carrier pallet 173 is not positioned for receiving a cord bundle 11 from the conveyor 10, the cam 187 depresses the left end of the lever 190 causing it to pivot counterclockwise (Fig. 6). This counterclockwise angular movement of the lever 190 causes the contactor plate 192 to pivot in a clockwise direction and force the post 197 into contact with the actuator 201. Thus, it is apparent that the arrangement of the lever 190 and the detector arm 193 is such that, when a pallet 173 does not occupy the "pallet loading" position or a bundle is loaded on a pallet occupying this "pallet loading" position, the post 197 is urged against the actuator 201 of the sensitive switch 203 with sufficient force to hold a contact of the switch open.

The electrical circuit associated with the alternative embodiment is substantially identical to the circuit associated with the first-described embodiment except for the substitution of the sensitive switch 203 for the sensitive switch 103. Hence, it is manifest that the ejector mechanism will remain inoperative and cannot discharge a cord bundle 11 from a carrier hook 15 if an empty pallet does not occupy the "pallet loading" position. In view of the substantially identical operation of the alternative embodiment, it is believed unnecessary to set out a further description of its operation.

It will be understood that the above-described embodiments are merely illustrative and that various modifications may be made within the spirit and scope of the invention. It is manifest that this invention is not limited to manually operated unloading conveyors, such as conveyors 60 and 160 hereinabove described. The intermittent indexing of the above conveyors might readily be accomplished by any suitably designed drive means.

What is claimed is:

1. Material-handling apparatus for unloading bundles of cords advancing continuously along a main conveyor, which comprises means operable for ejecting cord bundles from the conveyor, an endless belt, a plurality of carrier pallets attached spacedly to the belt, means for intermittently driving the belt to index the pallets successively into a position adjacent to the bundle-ejecting means for receiving a cord bundle ejected thereby from the conveyor, means normally operated whenever a cord bundle reaches a position opposite to the bundle-ejecting means for operating the latter to eject a bundle from the conveyor onto a pallet then positioned adjacent to the bundle-ejecting means, a pivotally mounted trigger arm having one end thereof positioned immediately adjacent to a pallet occupying said last-mentioned position and arranged to be depressed by the weight of an ejected bundle deposited upon said pallet, means actuated by the movement of the trigger arm for rendering the bundle-ejecting means inoperative so as to prevent another bundle from being deposited on a pallet which is already loaded, and a cam operatively connected to said pallet driving means and arranged to actuate said means for rendering the bundle-ejecting means inoperative to prevent the discharge of a bundle from the conveyor when a pallet is not positioned adjacent to the bundle-ejecting means for receiving a bundle.

2. Material-handling apparatus for unloading bundles of cords from a series of spaced carrier hooks supported pendantly from a continuously advancing tractor chain, which comprises a pivotally mounted ejector arm positioned adjacent to the path of the advancing carrier hooks, an endless belt, a plurality of carrier pallets attached spacedly to the belt, means for intermittently driving the belt to index the pallets successively into a position adjacent to the pivotally mounted ejector arm, means normally operated whenever a carrier hook reaches a position opposite to the ejector arm for rotating said arm to sweep a bundle of cords from said hook onto a pallet then positioned adjacent to the ejector arm, a pivotally mounted trigger arm having one end thereof positioned immediately adjacent to a pallet occupying said last-mentioned position and arranged to be depressed by the weight of an ejected bundle when the latter is deposited upon the pallet, electrical switching means operated by the movement of the trigger arm for rendering the ejector arm inoperative so as to prevent another bundle from being deposited on a pallet which is already loaded, and a cam operatively connected to said belt driving means and arranged to operate said electrical switching means to render the ejector arm inoperative whenever a pallet is not positioned adjacent to said arm for receiving a bundle ejected thereby from a carrier hook.

3. Material-handling apparatus for unloading bundles of cords advancing continuously along a main conveyor, which comprises means operable for ejecting cord bundles from the conveyor, an endless belt, a plurality of carrier pallets attached spacedly to the belt and designed to receive cord bundles ejected from the main conveyor, means for intermittently driving the belt to advance the pallets step by step and successively into a position adjacent to the conveyor for receiving a cord bundle ejected therefrom, means normally operated whenever a bundle reaches a position opposite to the bundle-ejecting means for operating said last-mentioned means to eject said bundle from the conveyor onto the pallet in the bundle-receiving position, a cam operatively connected to the belt for rotational movement in synchronism therewith, said cam having spaced detent engaging portions formed in its periphery, a pivotally mounted trigger arm having a projecting detent portion, resilient means for normally urging the detent portion of the trigger arm into engagement with the periphery of the cam, said detent portion being normally engaged in a detent engaging portion of the cam only when one of the pallets is in position for receiving an ejected bundle, electrical switching means actuated by the trigger arm whenever its detent portion is disengaged from a detent engaging portion of the cam to render the bundle-ejecting means inoperative, and means for disengaging the detent portion of the trigger arm independently of the angular position of the cam to render the bundle-ejecting means inoperative when the pallet is positioned for receiving an ejected bundle but is already loaded.

4. Material-handling apparatus for unloading bundles of cords advancing continuously along a main conveyor, which comprises means operable for ejecting the bundles individually from the conveyor, an endless belt, a plurality of carrier pallets attached spacedly to the belt and designed to receive and transport the individual bundles ejected from the main conveyor, a rotatable sprocket in driving engagement with the belt, a pivotally mounted operating lever, ratchet and pawl means operatively connecting the lever to the sprocket whereby oscillation of the lever causes intermittent, unidirectional movement of the belt to advance the pallets step by step and successively into a position adjacent to the conveyor for receiving a bundle ejected therefrom, means normally operated whenever a bundle reaches a position opposite to the bundle-ejecting means for operating said last-mentioned means to eject said bundle from the conveyor onto the pallet occupying the bundle-receiving position, a pivotally mounted, spring-biased detector arm having one end thereof positioned immediately adjacent to a pallet occupying said last-mentioned position and arranged to be depressed by the weight of an ejected bundle deposited upon said pallet, means actuated by the movement of the detector arm for rendering the bundle-ejecting means inoperative so as to prevent another bundle from being deposited on a pallet which is already loaded, and a cam connected to the operating lever for angular movement therewith, said cam being designed to actuate the means for rendering the bundle-ejecting means inoperative to prevent the discharge of a bundle from the conveyor when a pallet is not positioned for receiving the same.

References Cited in the file of this patent

UNITED STATES PATENTS

| | | |
|---|---|---|
| 2,120,052 | Bishop | June 7, 1938 |
| 2,320,961 | Whitcomb et al. | June 1, 1943 |